UNITED STATES PATENT OFFICE.

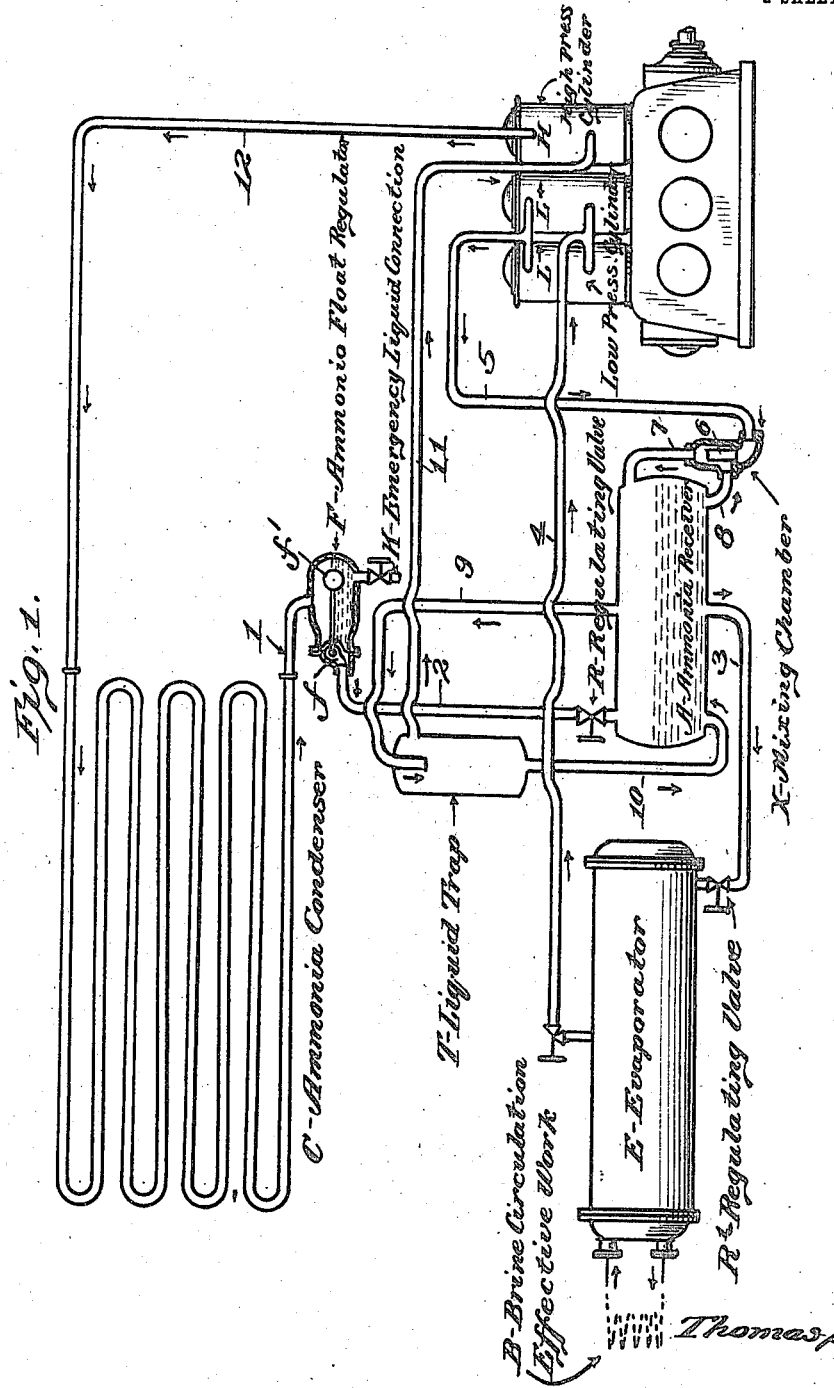

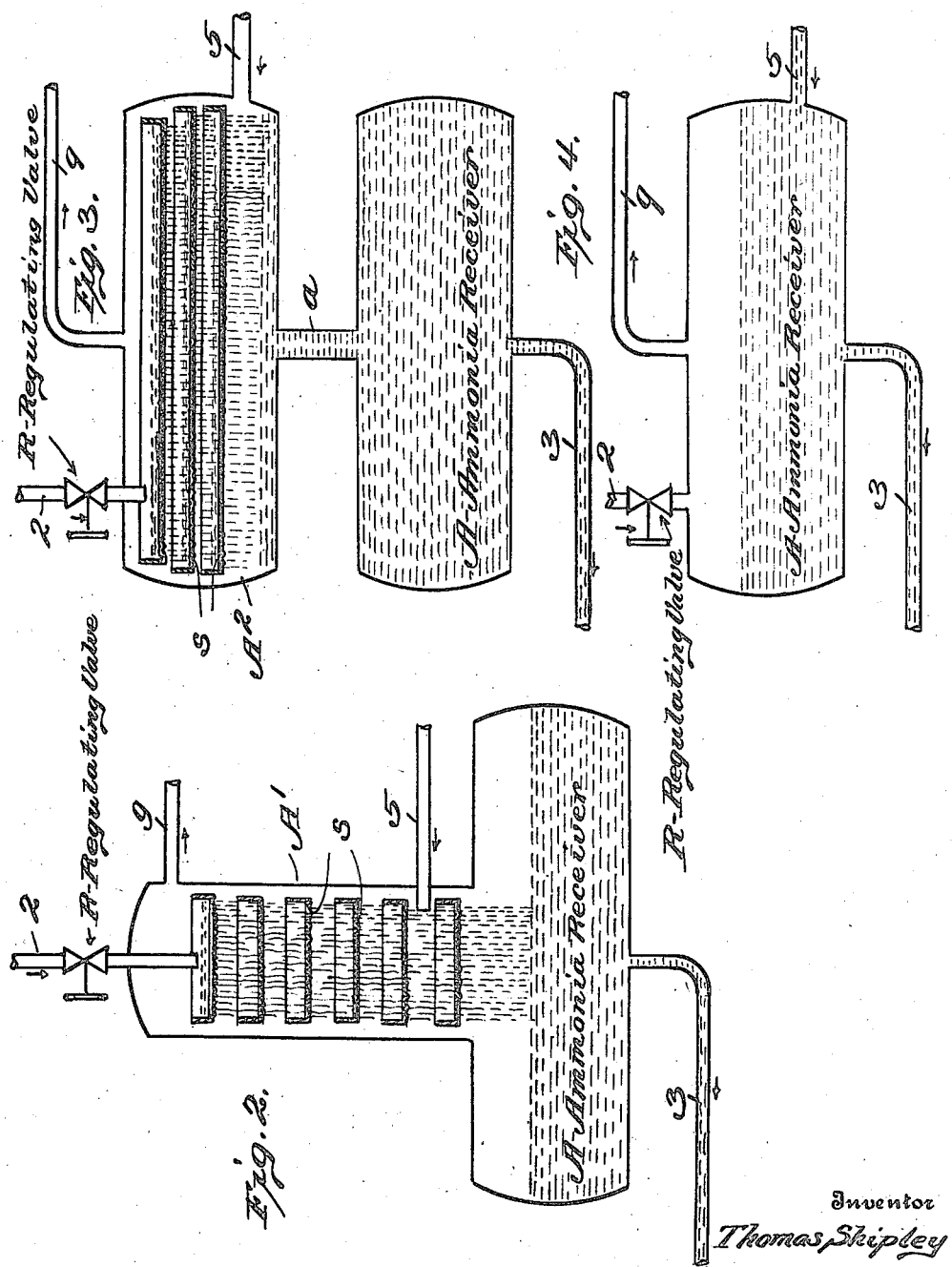

THOMAS SHIPLEY, OF YORK, PENNSYLVANIA.

REFRIGERATING OR ICE-MAKING APPARATUS.

1,253,895.   Specification of Letters Patent.   Patented Jan. 15, 1918.

Application filed May 3, 1917. Serial No. 166,141.

*To all whom it may concern:*

Be it known that I, THOMAS SHIPLEY, a citizen of the United States, residing at York, in the county of York and State of Pennsylvania, have invented certain new and useful Improvements in Refrigerating or Ice-Making Apparatus, of which the following is a specification.

My invention has been devised for the purpose of reducing the power required to produce useful work in the operation of refrigerating apparatus.

In such apparatus, the refrigerant must be cooled from the temperature at which the liquid is condensed to the temperature at which it is evaporated before any useful work can be done. The amount of the preliminary work required for this purpose is a very considerable item in the ordinary practice which prevails in the operation of refrigerating and ice making machinery, especially where temperatures below zero are required, and it is to reduce the power required to produce the net or useful work that the improvements hereinafter set forth have been devised by me.

My invention involves the steps of cooling the liquid in two or more stages, and of stage or compound compression; neither one of which steps is new broadly considered. But the manner in which I make use of these steps, and the combination of the instrumentalities for effectuating the same are new, and result in enhanced economy and efficiency and marked improvement in operation.

In a stage or compound compression system the evaporator in which the effective or useful work is done, draws its supply of refrigerant liquid from the receiver, and discharges its gas into the compression cylinder or cylinders of the low pressure stage of the compression system, the gas passing thence into the cylinders of the second or high pressure stage from which it passes to the condenser, where it is condensed into a liquid and in that form returns to the receiver. In compressing the gas in the first or low stage compression cylinders, its temperature is increased very rapidly, and it is necessary to cool it before it enters the second or high pressure compression cylinders—otherwise a very material loss in power will be sustained. Hitherto such cooling has been effected, so far as I am informed, in one of two ways—either by passing the gas through water cooled coils, or by injecting liquid ammonia into the pipe through which the gas must pass to enter the high pressure stage compression cylinders. Both of these methods are more or less ineffective, and the latter is dangerous as well.

The main characteristic of my invention is that the liquid receiver is used as a cooler for the compressed gas discharged from the first or low stage compression cylinders, the gas from the low stage of the compression system being passed into the liquid receiver and subjected to the action of the liquid therein whereby it is cooled, and thence passing thus-cooled through suitable conduits to the second or high stage compression cylinders of the system. This I believe to be broadly new with me.

This and other characteristic features of my invention can however best be explained in connection with the accompanying drawings to which I shall now refer for a better understanding of my improvements.

In these drawings:—

Figure 1 is a representation, largely diagrammatic, of an apparatus embodying my improvements in their preferred form.

Figs. 2, 3 and 4 represent diagrammatically modifications in the design of the liquid receiver and its connections, which will be hereinafter more particularly referred to.

The particular system which I shall describe is one in which anhydrous ammonia is used as a refrigerant, although obviously any other preferred refrigerant may be employed.

Confining attention to Fig. 1, C is the condenser in which the ammonia gas is liquefied; A is the receiver into which the liquefied ammonia is discharged from the condenser; E is the evaporator in which the useful work is performed, and which draws its supply of liquid ammonia for this purpose from receiver A; L, L, H is a three cylinder, two stage compressor of usual type, L, L being the two cylinders of the low stage compressor which receives the ammonia gas from the evaporator E, and H being the single cylinder high pressure compressor to which the gas from the low pressure compressor passes; from the high pressure compressor H the gas is returned to the condenser C, thus completing the cycle of operations.

This general cycle of operations has been used before and the parts of the apparatus thus far mentioned in connection therewith may be of any known or suitable construction. I come now to the new features which I have incorporated therein, and which have overcome, to a very great extent at least, the defects hitherto found in this type of apparatus.

The outlet end of the condenser communicates through a pipe 1 with a chamber or trap F, through which pipe the liquid ammonia from the condenser passes into said trap F. The trap has an outlet communicating with the receiver A through a pipe 2, which conducts the liquid ammonia from the trap outlet to the receiver. The trap outlet is automatically controlled by a float-operated regulating valve contained within the trap, $f$ being the valve and $f'$ the float. The valve and its connected float are so arranged that the valve will close the outlet to the trap, and thus shut off communication between the trap and the receiver, whenever the liquid contained in the body of the trap falls below a predetermined level, the purpose of this device being to shut off communication between the trap and the receiver whenever and so long as the flow of the liquid from the trap is not sufficient to exclude gas from passing down along with the liquid through pipe 2 and into the receiver, which latter in such event would become seriously interfered with. Float operated valves have heretofore been introduced into the liquid mains between condensers and receivers, and this I do not broadly claim; but so far as I am aware they never have been thus introduced for the same purpose for which I employ them nor with the same result.

In pipe 2 just before it reaches the receiver is placed a regulating valve R, which may be of the hand operated type or of the automatic pressure regulating type as preferred, so arranged that the flow of liquid can be throttled, at this point, at any pressure the valve may be set for. Valves of these types, are well known and require no further description.

From the bottom of receiver A leads a pipe 3 to the evaporator E where the useful work is done; it is provided with a regulating valve R' which like regulating valve R, can be of any type desired, and is so arranged as to throttle the flow of liquid at that point to the evaporator at any pressure the valve may be set for.

The evaporator E is represented as of the shell type, but it can of course be of any other type desired.

The gas produced by the evaporation of the liquid ammonia is conducted through cock or valve controlled pipe 4 to the suction end of the compressor cylinders, L, L, which here represent the "low pressure stage of the compression system" as it is called.

The compressed gas passes from the discharge end of the low pressure compression cylinders L, L through pipe 5. The compression of the gas during its passage at this stage through the compression cylinder L results, as heretofore stated, in a very rapid increase of its temperature and it becomes necessary to provide some means of reducing its temperature before admitting it to the second or high pressure compressor H.

I make use of the liquid ammonia receiver for this purpose, so connecting the receiver with the discharge end of the low pressure compressor on the one hand and the suction end of the high pressure compressor on the other hand that the gas from the low pressure compressor must pass through the receiver and in contact with the liquid therein before it can reach the high pressure compressor. Fig. 1 represents the preferred arrangement for this purpose, the compressed gas as it enters intermingling and mixing with a body of liquid maintained and renewed at that point, and the liquid that may happen to be entrained with the cooled gas passing off from the receiver, being trapped and separated out from the gas, and returned to the receiver. The means for maintaining liquid at the point where the gas enters the receiver consists of a hollow casting X, which I term a mixing chamber, having an inlet at the bottom, an outlet at the top, and a lateral opening which communicates through a supply pipe 8 with the interior of the receiver, at a point below the level of the liquid therein—preferably at the bottom of the receiver as shown. The pipe 5, which leads from the discharge end of the low pressure cylinder and conducts the gas therefrom, enters the inlet end of the mixing chamber with which it makes a fluid tight joint and extends therefrom vertically up into the mixing chamber as a stand pipe 6 which terminates a suitable distance below the outlet in the top of the mixing chamber. From this outlet leads a pipe 7 which enters the receiver at a point above the level of the liquid therein—preferably at or near the top of the receiver as shown so as to open directly into the space therein above the liquid. Under this arrangement it will be noted that the mixing chamber, and pipes 5, 6, 7, will be filled with liquid through the supply pipe 8, up to the level of the liquid in the receiver as indicated by the dotted line in the drawing. The gas from the low pressure compressor cylinders L, L, is forced under pressure through the body of liquid thus maintained, being cooled by its passage therethrough to the temperature due to the pressure in the receiver. A portion of the cooling liquid is naturally evaporated in cooling the gas, and the gas thus produced, together with the gas cooled, passes up through the pipe 7 into the gas space of the receiver. The loss of cooling liquid will be compensated for by liquid drawn from the receiver through pipe 8, and the total gas will pass out from the receiver through pipe 9, on its way to the second or high pressure compressor H.

In order, however, to separate the gas from any entrained liquid, I pass it through a suitable means for this purpose, located at a suitable point between the receiver and the second or high pressure compressor. The device, the construction of which can be considerably varied without departure from my invention, consists of a tight drum or hollow cylinder T, through the top of which the pipe 9 enters, extending some little distance down into the interior of the drum, where it discharges the gas downward. From the bottom of the drum extends a pipe 10 to the liquid space of the receiver A, for the purpose of returning to the receiver any liquid that may gather in the drum. From the drum T, at a point in it some distance above the downwardly pointing discharge end of the pipe 9, leads a pipe 11 to the suction end of the high pressure cylinder H. The device thus organized and arranged constitutes a simple and effective trap for separating the gas from any entrained liquid. Whatever entrained liquid there may be in the gas from the receiver which is discharged into the trap from the pipe 9, will be separated out therefrom and gather in the bottom of the trap whence it will be returned to the receiver through pipe 10; while the gas freed from the entrained liquid will pass out of the trap from the upper level therein above the discharge end of the pipe 9, through the pipe 11 to the high pressure compressor H. The compressor H compresses the gas to the pressure which prevails in the condenser C into which the gas is discharged through pipe 12 where it is condensed and again passed through the same cycle.

In the apparatus thus organized and operating, it will be noted that the receiver has three distinct valuable functions.

In the first place it acts as a receiver or reservoir for all the liquid reserve which is needed for the operation of the entire system or plant and it has the advantage of storing that liquid at a pressure very much lower than is the case in other systems—say at a pressure of from one fourth to one fifth the absolute pressure at which it is carried in any other system that I know of—a material advantage from the stand point of safety. Under this low pressure there will be little or no danger from bursting of any part of the apparatus, as all the liquid is drawn from the high or condensing side and stored at a pressure where explosions are practically out of the question, even in case of fire. Notwithstanding the reduction in pressure in the receiver, the difference in pressure in it, and in the evaporator E is still sufficient for all purposes except in a very exceptional case where a part of the evaporating system may be at a considerable distance from, or height above, the receiver, in which case it may be necessary to supply the small amount of liquid needed by a valve or cock controlled "emergency liquid connection" K opening into the bottom of the chamber F of the ammonia float regulator valve $f$ $f'$, and leading directly therefrom to the said distant part of the evaporating system. This emergency or additional liquid connection can also be utilized as a drain for the chamber F if desired.

Again the receiver A acts also as a cooler for the liquid reserve stored in it and used in the usual operation of said plants, its liquid contents being cooled to the exact temperature which is due to the pressure within the receiver.

And finally, and most important of all, the receiver A also serves as a cooler for the gas discharged from the low or first stage of the compression system. This feature, which I believe to be broadly new, removes the necessity for regulation, inasmuch as the receiver, so far as this function is concerned, takes care of itself, and will meet any demand made upon it because of the change of load from any cause without the necessity of making adjustments by hand of any kind—a feature most conducive to the safety and economy of plants of this kind.

The design of the receiver and its connections may be widely varied without departure from the spirit of my invention—some of these variations being indicated in Figs. 2, 3, 4. In these figures the pipes numbered 2, 3, and 5 are precisely similar in function to the correspondingly numbered pipes in Fig. 1.

The mixing chamber X in Fig. 1, for example can be dispensed with, and the gas from the low pressure cylinders L, L can be discharged through the pipe 5 directly into the body of ammonia liquid contained in the receiver A, as indicated in Fig. 4; although I prefer the apparatus of Fig. 1, inasmuch as the interposition of the mixing chamber between the pipe 5 and the body of the receiver will insure less violent agitation and action within the body of the receiver than would occur if the gas were discharged directly into the body of liquid within the receiver as in Fig. 4.

In Fig. 2 the receiver is surmounted by a vertical tower-like annex A', closed at top and having its open bottom secure fluid tight in a corresponding opening in the top of the receiver. Pipe 2 extends down through the top of the annex A' a certain distance and discharges the liquid ammonia upon horizontal screens $s$ arranged vertically one above the other and at a suitable space apart from one another, by its passage through which the liquid is divided up into drops like falling rain or spray. The pipe 5 through which the gas from the low pressure cylinders L, L is conveyed enters the side of the annex A' near its lower end; and the pipe 9, through which the cooled gas is conveyed to the device for separating entrained liquid from it, is located in the upper part of the cylinder at a point above the level of the discharge end of pipe 2. The gas discharged into the annex A', from the pipe 5, passes up through the annex and the cooling shower of ammonia liquid therein, and passes off through the upper pipe 9.

In Fig. 3, the annex, here designated $A^2$, is horizontal instead of vertical as in Fig. 2, and is connected to the body of the ammonia receiver A below it, by a vertical pipe $x$ through which the liquid contents of the receiver pass by gravity into the main body of the receiver. Otherwise the arrangement is substantially the same as in Fig. 2, with the same mode of operation.

Having described my improvements and the best way now known to me, I desire to state that I do not limit my claims to the structural details hereinbefore shown and described in illustration of my invention, since manifestly, as I have already indicated, the same can be considerably varied without departure from the spirit of my invention; but what I claim herein as new and desire to secure by Letters Patent is:

1. In a refrigerating or ice making apparatus in which stage or compound compression is employed, the combination with the evaporator, the condenser, the first or low pressure and second or high pressure compressors, and connection between the same whereby the gas from the first or low pressure compressor is conducted into the second or high pressure compressor, of the liquid receiver connected with and receiving the liquid refrigerant from the condenser, and interposed in the connections between the high and low pressures in such a manner that the gas from the low pressure cylinder passes through said receiver and in contact with the liquid therein, and is thereby cooled, before reaching the high pressure compressor, substantially as hereinbefore set forth.

2. In a refrigerating or ice making apparatus in which stage or compound compression is employed, the combination with the evaporator, the condenser, and the low and high pressure compressors, the former connected to and drawing its supply of gas from the evaporator and the latter connected to and discharging the highly compressed gas into the condenser, of the liquid receiver communicating with the outlet end of the condenser and receiving therefrom the liquid refrigerant, and connections on the one hand between the discharge end of the first or low pressure compressor and the receiver, and on the other hand between the receiver and the suction end of the second or high pressure compressor, whereby the gas discharged from the first or low pressure compressor, is caused to pass through said receiver and in contact with the liquid refrigerant therein, and thereby to be cooled, before entering the second or high pressure cylinder, substantially as and for the purposes hereinbefore set forth.

3. In combination with the elements of the combination specified in claim 2, means interposed in the connections between the liquid receiver and the second or high pressure cylinder whereby the entrained liquid in the cooled gas which passes from the receiver is separated out and carried off from said gas before the latter enters the high pressure compressor, substantially as hereinbefore set forth.

4. The combination with the liquid receiver and the first or low pressure compressor, of an annex to the receiver constituting a mixing chamber, freely communicating with the body of the receiver, means for furnishing a constant supply of refrigerant liquid to said annex chamber, connections between the low pressure compressor and the mixing chamber, whereby the gas from the compressor is discharged into and caused to pass through said mixing chamber in contact with the liquid therein, and is thereby cooled, and an outlet in the mixing chamber for the thus-cooled gas.

5. The combination with the condenser and the liquid receiver, and a conduit between the same through which liquid will pass by gravity from the condenser above to the receiver below, of a chamber interposed in said conduit having an inlet communicating with the condenser and an outlet communicating with the receiver below, a regulating valve controlling said outlet, and a float connected to the valve and automatically operating to close the same whenever the liquid in the said chamber falls below a predetermined level.

In testimony whereof I have hereunto set my hand in presence of two subscribing witnesses.

THOMAS SHIPLEY.

Witnesses:
J. B. ROBY,
J. F. WITMAN.